(12) United States Patent
Kean et al.

(10) Patent No.: US 10,053,838 B2
(45) Date of Patent: Aug. 21, 2018

(54) COUPLER LOAD MEASUREMENT FOR WORK VEHICLE

(71) Applicant: Deere & Company, Moline, IL (US)

(72) Inventors: Michael G. Kean, Maquoketa, IA (US); Eric R. Anderson, Galena, IL (US)

(73) Assignee: DEERE & COMPANY, Moline, IL (US)

( * ) Notice: Subject to any disclaimer, the term of this patent is extended or adjusted under 35 U.S.C. 154(b) by 195 days.

(21) Appl. No.: 15/061,363

(22) Filed: Mar. 4, 2016

(65) Prior Publication Data
US 2017/0254049 A1    Sep. 7, 2017

(51) Int. Cl.
| E02F 9/26 | (2006.01) |
| E02F 3/34 | (2006.01) |
| E02F 3/36 | (2006.01) |
| G01P 15/18 | (2013.01) |
| G01L 5/16 | (2006.01) |

(52) U.S. Cl.
CPC .............. *E02F 9/26* (2013.01); *E02F 3/3417* (2013.01); *E02F 3/3604* (2013.01); *G01L 5/16* (2013.01); *G01P 15/18* (2013.01)

(58) Field of Classification Search
CPC ......... E02F 9/26; E02F 3/3417; E02F 3/3604; G01L 5/16; G01P 15/18
See application file for complete search history.

(56) References Cited

U.S. PATENT DOCUMENTS

| 5,917,159 | A | 6/1999 | Kostiuk | |
| 6,518,519 | B1 | 2/2003 | Crane, III et al. | |
| 6,539,804 | B1 * | 4/2003 | Iwata | G01C 19/5677 73/504.13 |
| 7,926,427 | B1 | 4/2011 | Ricks et al. | |
| 8,117,773 | B2 * | 2/2012 | Seda | E02F 3/3631 37/403 |
| 8,126,619 | B2 | 2/2012 | Corder et al. | |
| 8,527,158 | B2 * | 9/2013 | Faivre | E02F 9/265 37/411 |
| 2006/0290102 | A1 * | 12/2006 | Vanbuskirk, Jr. | B60D 1/58 280/511 |

(Continued)

FOREIGN PATENT DOCUMENTS

| EP | 2843378 A1 | 3/2015 |
| WO | 2010125773 A1 | 11/2010 |

*Primary Examiner* — Jamie L McGowan
(74) *Attorney, Agent, or Firm* — Klintworth & Rozenblat IP LLP; Steven Wietrzny

(57) ABSTRACT

A coupler assembly for coupling a work implement to a work vehicle includes a coupler mounted to the work vehicle and to the work implement. The coupler assembly further includes at least one force sensor mounted to the coupler and configured to collect force data associated with force transferred by the coupler assembly from the work implement to the work vehicle. The coupler assembly includes at least one acceleration sensor mounted to the coupler and configured to collect acceleration data associated with acceleration of the coupler assembly during operation. The acceleration sensor and the force sensor are configured to be coupled to a controller that receives and processes the force data and the acceleration data to determine a mass of a load of the work implement.

20 Claims, 8 Drawing Sheets

(56) References Cited

U.S. PATENT DOCUMENTS

| | | | | |
|---|---|---|---|---|
| 2012/0024081 A1* | 2/2012 | Baker | ............... | B60D 1/06 |
| | | | | 73/862.338 |
| 2012/0325505 A1* | 12/2012 | Grimes | ............... | E02F 3/3627 |
| | | | | 172/272 |
| 2013/0253814 A1* | 9/2013 | Wirthlin | ............... | G01G 19/02 |
| | | | | 701/124 |
| 2015/0275469 A1* | 10/2015 | Fredrickson | ............... | E02F 3/3414 |
| | | | | 414/685 |
| 2016/0011090 A1 | 1/2016 | Mizuochi et al. | | |

* cited by examiner

COUPLER LOAD MEASUREMENT FOR WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to work vehicles, and more specifically to systems and methods to measure the load carried by an implement of a work vehicle.

BACKGROUND OF THE DISCLOSURE

In the construction and other industries, work vehicles utilize implements to perform work, such as to lift and move loads of various types of materials. As an example, a loader may include a bucket pivotally coupled to a frame with a linkage assembly that manipulates the bucket containing the load into a desired position or location.

SUMMARY OF THE DISCLOSURE

The disclosure provides a system and method for measuring the load of an implement of a work vehicle.

In one aspect, the disclosure provides a coupler assembly for coupling a work implement to a work vehicle. The coupler assembly includes a coupler mounted to the work vehicle and to the work implement. The coupler assembly further includes at least one force sensor mounted to the coupler and configured to collect force data associated with force transferred by the coupler assembly from the work implement to the work vehicle. The coupler assembly includes at least one acceleration sensor mounted to the coupler and configured to collect acceleration data associated with acceleration of the coupler assembly during operation. The acceleration sensor and the force sensor are configured to be coupled to a controller that receives and processes the force data and the acceleration data to determine a mass of a load of the work implement.

In another aspect, the disclosure provides a work vehicle with a chassis supported by ground-engaging wheels or tracks; a machine linkage coupled to the chassis; a coupler connected to the machine linkage; a work implement mounted to the coupler for carrying a load with a mass; and a load measurement system. The load measurement system includes at least one force sensor mounted to at least one of the machine linkage, the coupler assembly, and the work implement and configured to collect force data associated with force transferred between at least one of the machine linkage and coupler assembly or the coupler assembly and the work implement. The load measurement system further includes at least one acceleration sensor mounted to at least one of the machine linkage, the coupler assembly, or the work implement to collect acceleration data associated with acceleration of the load during operation. At least one of the force sensor and the acceleration sensor is incorporated into the coupler. The load measurement system further includes a controller coupled to the force sensor and the acceleration sensor and configured to receive and process the force data and the acceleration data to determine the mass of the load.

In yet another aspect, the disclosure provides a method of determining a mass of a load carried by a work implement coupled to a work vehicle by a linkage assembly and a coupler. The method includes collecting, with at least one force sensor, force data associated with force transferred between the work implement and the work vehicle during operation; collecting, with at least one acceleration sensor, acceleration data associated with acceleration of the load in the work implement during operation; and determining, with one or more controllers, the mass of the load based on the force and acceleration data.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
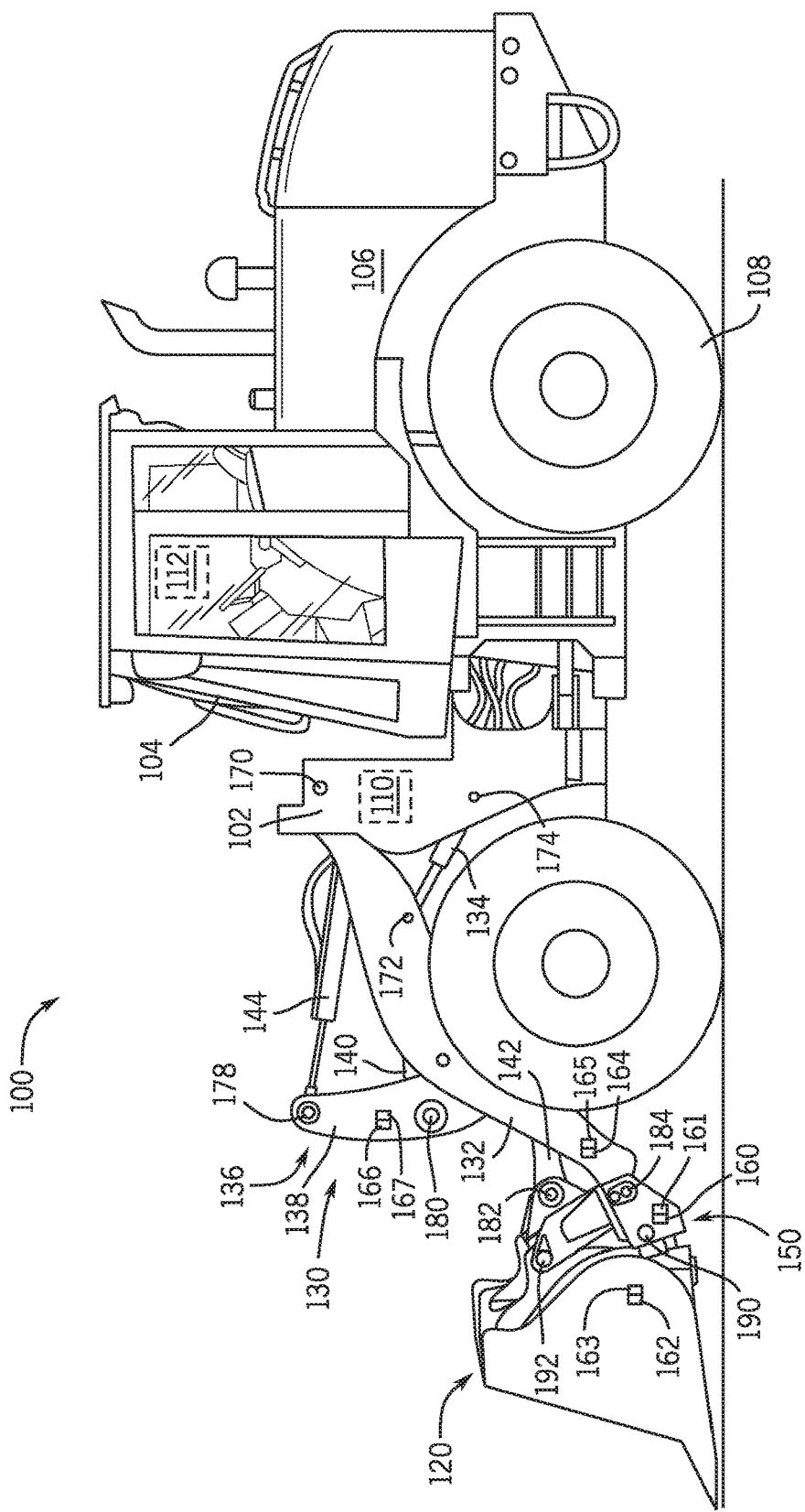
FIG. 1 is a side view of an example work vehicle in the form of a wheeled loader in which a load measuring system and method may be used in accordance with this disclosure.

The following describes one or more example embodiments of the disclosed implement load measurement system and method, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "forward," "aft," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the tillage implement, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the loader described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As noted, for various reasons, it may be desirable for a work vehicle operator to know one or more characteristics of the material load in the implement. Conventional approaches of load measuring may include systems and methods that attempt to derive load from various hydraulic pressure sensors along the linkage assembly actuators, but these approaches rely upon the exact position measurements of the load and assumptions about the various force interactions between the load and the individual sensors. Conventional approaches may have issues with complexity, cost, and accuracy.

Generally, a coupler assembly is used to attach a work implement to a work vehicle, typically between the implement and a boom or linkage assembly of the work vehicle to transfer force between the various actuators used by the work vehicle to maneuver the implement and load. Discussion herein may sometimes focus on the example application of moving a work implement configured as a scoop or bucket for a loader. In other applications, other configurations are also possible. In some embodiments, for example, claws, grapples, or other devices may also be configured as movable end effector implements. Likewise, work vehicles in some embodiments may be configured as excavators or other diggers, as forwarders, as skidders, or similar machines, or in various other ways.

The following describes one or more example implementations of the disclosed system for measuring the mass of a load during a loading operation by calculating a load mass from force and acceleration data collected at one or more interfaces between the coupler assembly and the linkage assembly and/or between the coupler assembly and the implement, as shown in the accompanying figures of the drawings described briefly above. Generally, the disclosed systems and methods (and work vehicles in which they are implemented) provide for improved accuracy of load measurements as compared to conventional systems.

Referring to FIG. 1, in some embodiments, the disclosed load measuring systems and methods may be used with a work vehicle 100 that manipulates a load of material. As shown, the work vehicle 100 may be considered to include a main frame or chassis 102, an implement 120, a linkage assembly 130, and a coupler assembly 150. Broadly, the implement 120 is coupled to the linkage assembly 130 with the coupler assembly 150, and the linkage assembly 130 is mounted to the frame 102. The structure and operation of the work vehicle 100 is described below with reference to FIG. 1, prior to a more detailed description of a load measuring system 200 with reference to FIG. 2. Further, additional details about the coupler assembly 150, linkage assembly 130, and implement 120 will be provided with reference to FIGS. 3-6, including details about implementing the load measuring system 200 of FIG. 2 into the work vehicle 100 of FIG. 1. The discussion below references an xyz-coordinate system for the work vehicle 100 in which the x-orientation is a longitudinal or fore-aft orientation, the y-orientation is a lateral or side-to-side orientation, and the z-orientation is a vertical or up-down orientation.

Generally, a primary function of the work vehicle 100 is to manipulate one or more types of material with the implement 120. In the depicted example, the implement 120 generally defines a receptacle for the receipt of various materials, such as dirt, rocks, wet dirt, sand, hay, etc. Generally, the material contained within the implement 120 (e.g., the material carried within a bucket of a loader) at a given time is referenced herein as the "load." However, the term "load" may include both the carried material and some or all of the implement (e.g., the material carried in the bucket and the bucket itself). It will be understood that the configuration of the work vehicle 100 as a loader is presented as an example only, and any type of implement, actuators, linkage, and vehicle may be used with the load measuring system discussed herein. Aspects of one example of the work vehicle 100 will be introduced prior to a more detailed description of the load measuring system.

As shown in FIG. 1, the work vehicle 100 includes an operator cab 104 mounted to the frame 102 in which an operator controls operation of the work vehicle 100. As is typical, the work vehicle 100 includes a power plant 106 (e.g., an internal combustion engine, a fuel cell, an electric motor, and/or a hybrid-gas electric motor) used for propulsion of the work vehicle 100 via wheels or tracks 108, as well as to drive manipulation of the implement 120 as described in greater detail below. The work vehicle 100 may further include a control system 110 that assists in operation, and a operator interface 112 that enables the operator to interact with the control system 110 and other aspects of the work vehicle 100.

The control system 110 has one or more controllers to control various aspects of the operation of the work vehicle 100. The control system 110 (or others) may be configured as a computing device with associated processor devices and memory architectures, as a hard-wired computing circuit (or circuits), as a programmable circuit, as a hydraulic, electrical or electro-hydraulic controller, or otherwise. As such, the control system 110 may be configured to execute various computational and control functionality with respect to the work vehicle 100 (or other machinery). In some embodiments, the control system 110 may be configured to receive input signals in various formats (e.g., as hydraulic signals, voltage signals, current signals, and so on), and to output command signals in various formats (e.g., as hydraulic signals, voltage signals, current signals, mechanical movements, and so on). The control system 110 may communicate with other systems or devices (including other controllers) in various known ways, including via a CAN bus (not shown) of the work vehicle 100, via wireless or hydraulic communication means, or otherwise. An example location for the control system 110 is depicted in FIG. 1. It will be understood, however, that other locations are possible including other locations on the work vehicle 100, or various remote locations.

In some embodiments, the control system 110 may be configured to receive input commands and to interface with the operator via the operator interface (or human-machine interface) 112, which may be disposed inside the cab 104 of the work vehicle 100 for convenient access by the operator. The operator interface 112 may be an input device and an output device and configured in a variety of ways. In some embodiments, the operator interface 112 may include one or more joysticks, various switches or levers, one or more buttons, a touchscreen interface that may be overlaid on a display, a keyboard, a speaker, a microphone associated with a speech recognition system, or various other human-machine interface devices. Additional details about further aspects and functions of the control system 110 will be provided below after an introduction of the remaining portions of the work vehicle 100.

As noted above, the implement 120 is coupled to the frame 102 with the linkage assembly 130 and the coupler assembly 150. In particular, one end of the linkage assembly 130 is attached to the frame 102 and the other end of the linkage assembly 130 is attached to the coupler assembly 150. The coupler assembly 150 is selectively attached to the implement 120 to enable the implement 120 to be removed and replaced with another type of implement 120, depending on the task of the work vehicle 100. Although the coupler assembly 150 and implement 120 are illustrated and described as being separate connectable components, those skilled in the art will understand that each implement may be configured as a unitary component having a material engaging portion, such as the bucket or forks, and a coupling portion having the points of attachment for connecting the implement to the work vehicle 100.

The linkage assembly 130 includes a pair of lift arms 132. One end of each lift arm 132 is pivotally connected to the frame 102 and the other end is pivotally connected to the coupler assembly 150 proximate a bottom portion thereof. Lift cylinders 134 are provided between the frame 102 and the lift arms 132 to pivot the lift arms 132 relative to the frame 102. In particular, the lift cylinders 134 may be extended to raise the lift arms 132 and retracted to lower the lift arms 132. In typical implementations, two lift arms 132 are provided, with each arm having a corresponding lift cylinder 134. However, other configurations and arrangements providing similar functionality as kinematic elements may be implemented.

The example linkage assembly 130 includes a pivot linkage 136 mounted to the coupler assembly 150 and the frame 102 and/or lift arms 132. The pivot linkage 136 may include a tilt lever 138 pivotally connected to a tilt lever support 140 mounted to the lift arms 132. At one end of the tilt lever 138, a tilt link 142 has one end pivotally connected to the end of the tilt lever 138, and the opposite end pivotally connected to the coupler assembly 150 proximate the top. A tilt cylinder 144 couples the opposite end of the tilt lever 138 to the frame 102 with pivotal connections at either end. As a result of this arrangement, extension and retraction of the tilt cylinder 144 pivots the coupler assembly 150 and attached implement 120 relative to the linkage assembly 130. For example, the tilt cylinder 144 enables pivoting of the implement 120 between a racked position and a dump position.

Accordingly, the frame 102, linkage assembly 130, coupler assembly 150, and implement 120 are coupled together at a number of fixed connections and pivot connections, some of which are depicted in FIG. 1 and further described in greater detail below. As an example, the linkage assembly 130 is attached with the lift arms 132 to the frame 102 at pivot connections 170. The lift cylinders 134 are attached to the lift arms 132 at pivot connections 172 and to the frame 102 at further pivot connections 174. The tilt cylinder 144 is attached to the tilt lever 138 at pivot connection 178 and to the frame 102 at a further connection (not shown in FIG. 1). The tilt lever 138 is attached to the tilt lever support 140 at pivot connection 180. The tilt link 142 is attached to the coupler assembly 150 at pivot connection 182 and to the tilt lever 138 at a further pivot connection (not shown in FIG. 1). The lift arms 132 are attached to the coupler assembly 150 at pivot connections 184, and the coupler assembly 150 is fixed to the implement 120 at connections 190, 192.

In the description below, one or more components that form the connections between the coupler assembly 150 and the linkage assembly 130 may be considered a first (or linkage) connection interface. Similarly, one or more components that form the connections between the coupler assembly 150 and the implement 120 may be considered a second (or implement) connection interface. These connection interfaces represent the locations at which force is transferred between the linkage assembly 130, coupler assembly 150, and/or implement 120, thereby enabling forces at least partially attributable to the load to be measured.

Although not discussed in further detail, it will be understood that the work vehicle 100 may include any suitable components (e.g., pumps, values, conduits, devices, and systems) to implement these functions. For example, various sensors may be provided to observe various conditions associated with the work vehicle 100. Such sensors may include pressure sensor and flow sensors for the hydraulic components; position, velocity, and acceleration sensors for the various components and/or the work vehicle 100; and any other suitable sensors for carrying out the functions of the work vehicle 100.

In one example, sensor assemblies 160-167 may be mounted to, or otherwise incorporated with, various aspects of the work vehicle 100. In the depicted example, sensor assemblies 160, 161 are associated with the coupler assembly 150; sensor assemblies 162, 163 are associated with the implement 120; sensor assemblies 164, 165 are associated with the lift arms 132; and sensor assemblies 166, 167 are associated with the tilt link 142. As described in greater detail below, each sensor assembly 160, 162, 164, 166 may include one or more acceleration sensors, and each sensor assembly 161, 163, 165, 167 may include one or more force sensors. Collectively, the acceleration sensor assemblies 160, 162, 164, 166 may be considered an acceleration sensor assembly group, and the force sensor assemblies 161, 163, 165, 167 may be considered a force sensor assembly group. In some embodiments, one or more of the sensor assemblies 160-167 may be omitted. Further, in some embodiments, one or both of the acceleration sensors and force sensors that make up each sensor assembly 160-167 may be omitted. Moreover, additional acceleration and/or the force sensors, as well as other types of sensors, may be provided. As described below, the sensor assemblies 160-167 provide acceleration and force measurement data to the control system 110 for further processing and consideration. The sensor assemblies 160-167 may communicate with the control system 110 in any suitable manner, including wired or wireless communication schemes.

As such, during operation, an operator in the operator cab 104 manipulates the work vehicle 100, and particularly the coupler assembly 150 and implement 120, by activating the cylinders 134, 144 of the linkage assembly 130 via the control system 110 and operator interface 112. In addition to the typical operation of the work vehicle 100, a load measuring system is configured to generate the mass of the load based on acceleration and force data gathered by one or more of the sensor assemblies 160-167. As described in greater detail below, the force data may be collected at or near the linkage and/or implement connection interfaces at which force is transferred between the linkage assembly 130, the coupler assembly 150, and/or the implement 120. Similarly, the acceleration data may be measured at or near the linkage connection interface between the coupler assembly 150 and the linkage assembly 130 and/or at or near the implement connection interface between the coupler assembly 150 and the implement 120. The acceleration values for the load in the implement 120 may be derived from the acceleration values. Similarly, force values attributable to the load may be calculated from the force data collected at the connection interfaces. As described below, these acceleration and force values may be used to determine the mass of the load.

Figure 2:
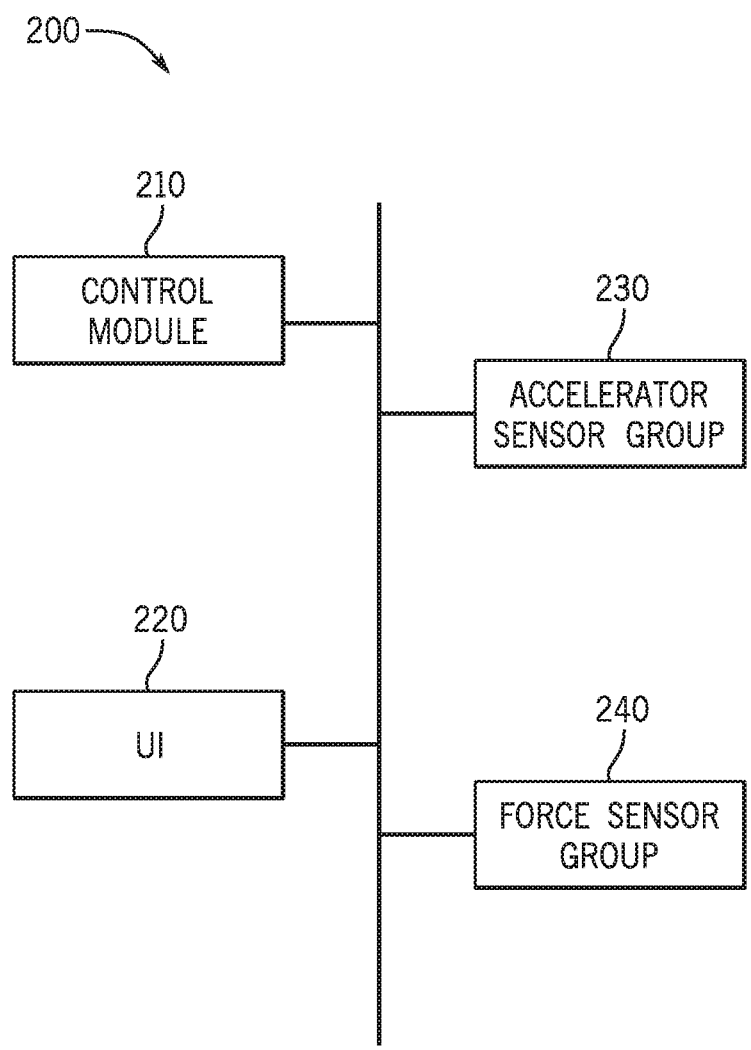
FIG. 2 is a functional block diagram of a load measuring system in accordance with an example embodiment.

Referring also to FIG. 2, the load measuring system 200 may include a control module 210, a user interface 220, an acceleration sensor group 230, and a force sensor group 240 coupled together in any suitable manner. As will also be discussed in greater detail below, the load measuring system 200 may also be considered to include one or more of the components of the work vehicle 100, including aspects of the linkage assembly 130, coupler assembly 150, and implement 120.

In one example, the control module 210 is depicted as a functional unit or module that includes processing components to accomplish the functions of the load measuring system 200 described herein. In some examples, such processing components may include digital computers or microprocessors with suitable logic circuitry, memory, software and communication buses associated with the data processing and storage discussed below. The control module 210 may be incorporated into the control system 110 (FIG. 1) or a further vehicle controller, or the control module 210 may be a stand-alone module or controller.

The acceleration sensor group 230 includes one or more sensor elements that function to collect data associated with the acceleration of the load. For example, the acceleration sensor group 230 may include one or more of the sensor assemblies 160, 162, 164, 166 described above. The acceleration data may be collected in any of the three coordinate axis orientations (e.g., x, y, and/or z) at any one or more of the linkage assembly 130, coupler assembly 150, and/or implement 120.

The acceleration sensor elements of the acceleration sensor group 230 may take any of numerous forms. For example, the acceleration sensor elements of the acceleration sensor group 230 may be in the form of standard accelerometers, such as capacitive type, piezoelectric type, piezoresistive type, and the like, from which acceleration values may be derived. In one particular example, the acceleration sensor group 230 includes one or more inertial measurement units (IMUs) with a combination of accelerometers, gyroscopes, and/or magnetometers. The IMU may include, for example, three accelerometers, gyroscopes, and/or magnetometers arranged orthogonally to one another to measure various characteristics, including acceleration, in all three axis orientations. Further examples and configurations are discussed below.

The force sensor group 240 includes one or more sensors that function to collect data associated with the force on the work vehicle 100 resulting from the load. As examples, the force sensor group 240 may include one or more of the sensor assemblies 161, 163, 165, 167 described above. The force data may be collected in any of the three coordinate axis orientations (e.g., x, y, and/or z) at any one or more of the linkage assembly 130, coupler assembly 150, and/or implement 120. The force sensor elements of the force sensor group 240 may take any of numerous forms. For example, the force sensor elements may be in the form of force gauges, load cells, piezoelectric sensors, strain gauges, and capacitive and inductive type sensor elements. Further examples and configurations are discussed below.

The user interface 220 may be any suitable input and/or output device for interacting with the load measuring system 200. In one example, the user interface 220 is an output device, such as a display screen or audio speaker, that generates a visual or audio signal to the operator representing the calculated load mass from the control module 210. In some examples, the user interface 220 may be incorporated into the operator interface 112, discussed above.

Generally, during operation and as described in greater detail below, the control module 210 receives acceleration data from the acceleration sensor group 230. Since the acceleration data may be collected at various positions on the work vehicle 100, the control module 210 evaluates the acceleration data to determine the acceleration of the load.

In one example, the control module 210 may have one or more look-up tables or algorithms that derive or calculate the acceleration of the load from acceleration data collected by one or more of the acceleration sensors of the acceleration sensor group 230 based on the position of the respective sensor relative to the center of mass of the load. The acceleration values for the load may be expressed as a vector or with respect to any one or more of the three coordinate axis orientations (e.g., x, y, and/or z).

The control module 210 receives force data from the force sensor group 240. Since the force data may be collected at various positions on the work vehicle 100, the control module 210 evaluates the force data to determine the force that may be attributed to the load, including an accounting for known forces resulting from the mass of the components of the work vehicle 100 in an unloaded state. In one example, the control module 210 may have one or more look-up tables or algorithms that derive or calculate the force of the load from force data at the position(s) of one or more of the force sensors of the force sensor group 240. The force values for the load may be expressed as a vector or with respect to any one or more of the three coordinate axis orientations (e.g., x, y, and/or z).

In some examples, the control module 210 may receive data from various parts of the work vehicle 100 and/or external systems or sources. As an example, the control module 210 may receive data associated with overall movement of the work vehicle 100, such as when the entire work vehicle 100 is being moved with the wheels.

Upon the determination of the acceleration and force values, the control module 210 calculates the mass of the load. As an example, the control module 210 may calculate the mass of the load in one or more of the three coordinate axis orientations, as provided below in the following expression:

$$\text{mass} = \frac{\text{force}_{x,y,z}}{\text{acceleration}_{x,y,z}}$$

Since mass is the same in any orientation, the mass may be calculated from any one of the three coordinate axis orientations. However, calculating the mass with data from two or three orientations may provide a level of redundancy for the resulting mass value. The load measurements in different orientations may be combined in a number of ways. For example, the load measurements in the various orientations may be averaged. In another example, the load measurement may be subject to a weighted average based on operating conditions. In a further example, the measurements in different orientations may also be combined with a Kalman filter to provide an optimal estimate of the payload weight. In another example with IMUs as the acceleration sensors, the associated gyroscope data may be leveraged to increase system accuracy. In particular, such gyroscope data may be used to track orientation of the implement 120 and estimate the direction of gravity such that the direction of gravity could then be more heavily weighted in an averaging process. Moreover, such gyroscope data may be combined with the linkage kinematics and the orientation of the implement 120 with respect to gravity to give an estimate of the expected acceleration at the implement 120, which may then be combined with the measured accelerations in a Kalman filter to further improve measurement accuracy.

In some examples, the control module 210 may also receive data that indicates when the implement 120 is actively engaging and cutting the soil such that the force passing through the coupler assembly 150 would include the weight of the load and the additional digging forces. As such, in some examples, the control module 210 may filter out or otherwise remove the additional digging forces to determine the weight of the load to avoid inaccurate measurements. For example, the digging forces are typically misaligned with the direction of net acceleration of the implement and/or the digging forces may result in relatively large jumps in the force and acceleration data, thereby enabling these characteristics to be used to remove the digging forces from the load measurements. In some examples, the load measurement may be timed to ensure that the implement 120 is free from the cut.

Now that the overall operations of the work vehicle 100 and force measurement system 200 have been described, more detailed examples of the incorporation of the various sensor elements of the load measuring system 200 into work vehicle 100 will be described below.

Figure 3:
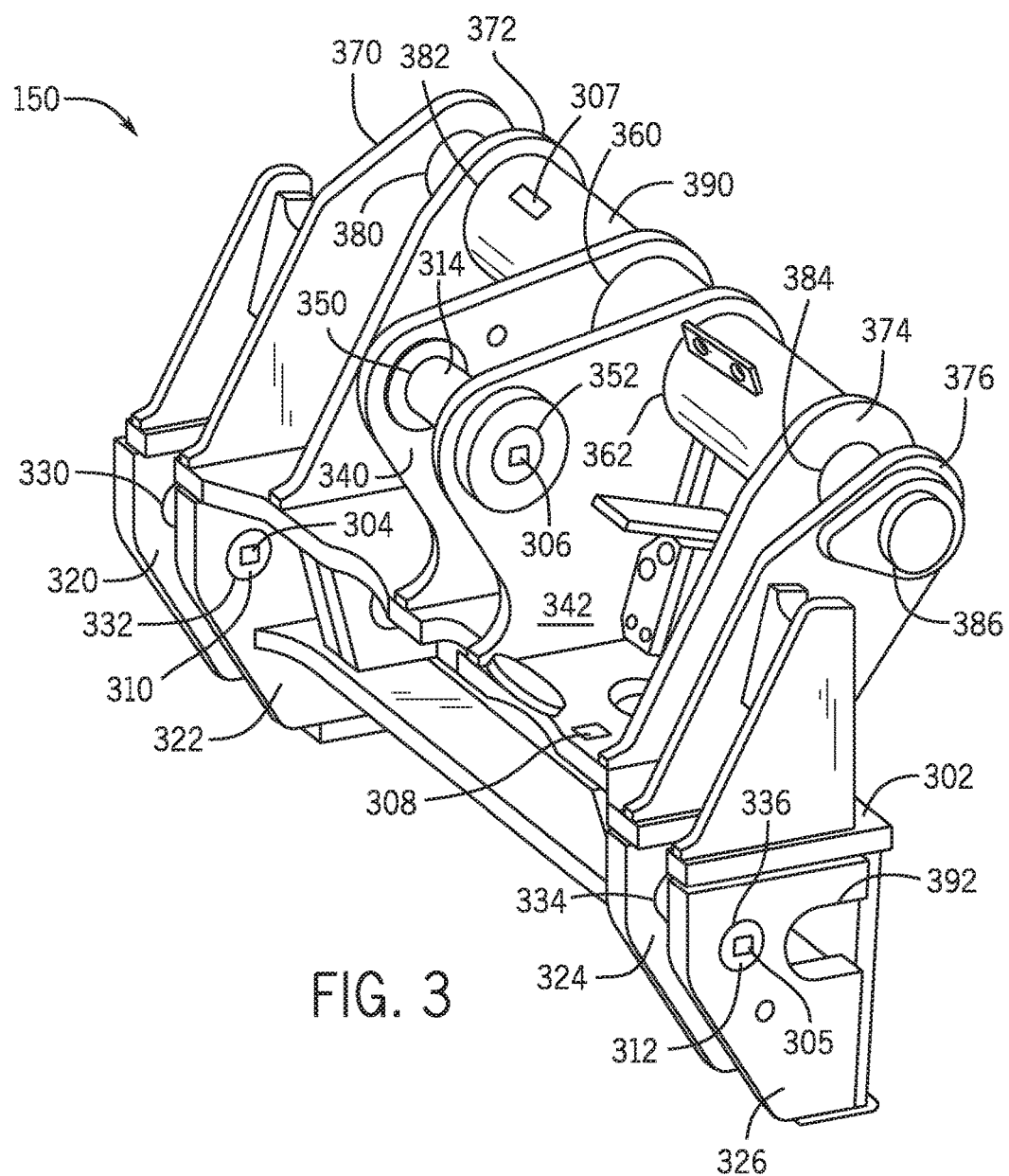
FIG. 3 is an isometric view of a coupler assembly of the work vehicle of FIG. 1 in accordance with an example embodiment.

FIG. 3 shows the coupler assembly 150 removed from other components of the work vehicle 100 of FIG. 1. FIGS. 1 and 3 depict one example of a coupler assembly 150, and other coupler assembly arrangements may be provided. In this example, the coupler assembly 150 includes a body element 302 that generally corresponds to a base or plate structure to which various other components are attached. In particular, a number of lift mounting plates 320, 322, 324, 326 extend in a vertical direction (e.g., in the z-orientation) from the body element 302. In this example, the lift mounting plates 320, 322, 324, 326 extend below the body element 302. The lift mounting plates 320, 322, 324, 326 include a first (or left) pair of lift mounting plates 320, 322 and a second (or right) pair of lift mounting plates 324, 326 proximate to the lateral ends (e.g., in the y-orientation) of the body element 302. Each of the left pair of lift mounting plates 320, 322 defines a lift mounting hole 330, 332, and each of the right pair of lift mounting plates 324, 326 defines a lift mounting hole 334, 336. The mounting holes 330, 332 of the left pair of lift mounting plates 320, 322 are aligned to accommodate a left lift mounting pin 310, and the mounting holes 334, 336 of the right pair of lift mounting plates 324, 326 are aligned to accommodate a right lift mounting pin 312.

A pair of tilt mounting plates 340, 342 extend in a vertical direction (e.g., in the z-direction) from the body element 302. In this example, the tilt mounting plates 340, 342 extend above the body element 302, generally in a lateral center of the body element 302. Each of the tilt mounting plates 340, 342 defines a tilt mounting hole 350, 352 aligned to accommodate a tilt mounting pin 314. As described below, the tilt mounting plates 340, 342 also respectively define a pair of implement mounting holes 360, 362.

Figure 5:
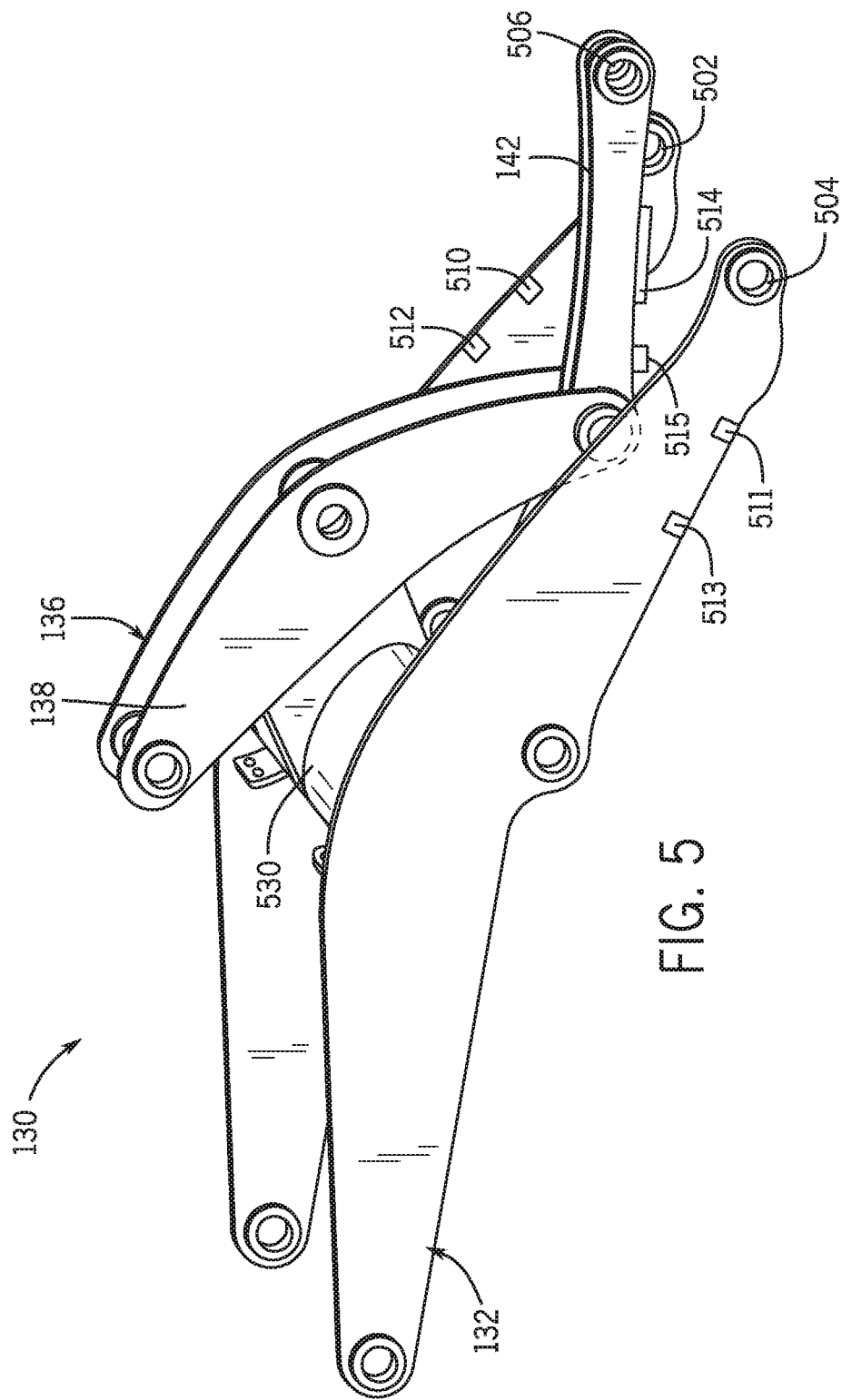
FIG. 5 is an isometric side view of a linkage assembly of the work vehicle of FIG. 1 in accordance with an example embodiment.

For the description of the components of the coupler assembly 150 that interact with the linkage assembly 130, reference is briefly made to FIG. 5, which depicts aspects of the linkage assembly 130 removed from the work vehicle 100. As shown in FIG. 5, the linkage assembly 130 includes the pair of lift arms 132 joined by a cross member 530 on which the tilt lever 138 and tilt link 142 of the pivot linkage 136 are mounted. When attaching the coupler assembly 150 to the linkage assembly 130, the first lift arm 132 is secured by the pin 310 between the lift mounting plates 320, 322 and the second lift arm 132 is secured by the pin 312 between the lift mounting plates 324, 326, thereby enabling the linkage assembly 130 to manipulate the coupler assembly 150 (and the implement 120 when the implement 120 is attached to the coupler assembly 150). The tilt link 142 is secured by the pin 314 between the tilt mounting plates 340, 342 to secure the coupler assembly 150 to the pivot linkage 136, thereby enabling the linkage assembly 130 to pivot the coupler assembly 150 (and the implement 120 when the implement 120 is attached to the coupler assembly 150). As such, collectively or individually, the lift mounting plates 320, 322, 324, 326, lift mounting pins 310, 312, tilt mounting plates 340, 342, and tilt mounting pin 314 may be considered the coupler assembly portion of the linkage connection interface between the coupler assembly 150 and the linkage assembly 130. The linkage assembly portion of the linkage connection interface is described in greater detail below, in addition to the various sensors that may be incorporated into this connection interface.

Referring again to FIG. 3, a number of support plates 370, 372, 374, 376 extend in an upward vertical direction from the body element 302. In this example, the support plates 370, 372, 374, 376 respectively define implement mounting holes 380, 382, 384, 386. A cross bar or cross member 390 extends through the implement mounting holes 380, 382, 384, 386 in the support plates 370, 372, 374, 376, as well as the implement mounting holes 360, 362 in the tilt mounting plates 340, 342. The cross member 390 is structured to receive or accommodate attachment to the implement 120, as described below. Additionally, a pair of implement brackets 392 (one of which is shown in FIG. 1) may be formed on one or more of the lift mounting plates 320, 322, 324, 326 to further accommodate attachment to the implement 120. In the depicted example, a first implement bracket 392 is formed in the lift mounting plate 320, and a second implement bracket (not shown) may be formed in the lift mounting plate 326. As such, collectively or individually, the support plates 370, 372, 374, 376 and/or tilt mounting plates 340, 342, cross member 390, and implement brackets 392, 394 may be considered the coupler assembly portion of the implement connection interface between the coupler assembly 150 and the implement 120. The implement assembly portion of the implement connection interface is described in greater detail below, in addition to the various sensors that may be incorporated into this connection interface.

As introduced above, the coupler assembly 150 may include one or both of the acceleration sensor assembly 160 and the force sensor assembly 161 that collectively include one or more sensors or sensor elements 304-308 in various locations on or within the coupler assembly 150. For example, force sensor elements 304-306 in the form of strain gauges or load cells may be incorporated into the lift mounting pins 310, 312 and tilt mounting pin 314, as schematically shown, to measure force data associated with the force transferred between the coupler assembly 150 and the linkage assembly 130. As another example, one or more force sensors 307 may be incorporated into the cross member 390, as also schematically shown, to measure force data associated with the force transferred between the coupler assembly 150 and the implement 120. As a further example, one or more acceleration sensors 308 may be incorporated into or mounted to the body element 302, as shown, to measure acceleration data. In still other examples, the acceleration sensor(s) may be incorporated into or mounted to one or more of the various plates 320, 322, 324, 326, 340, 342, 370, 372, 374, 376.

Accordingly, one example of a coupler assembly 150 has been described. For clarity, the structural aspects of the coupler assembly 150 (such as the body element 302, plates 320, 322, 324, 326, 340, 342, 370, 372, 374, 376, pins 310, 312, 314, and cross-member 390) may be generally referred to as the "coupler." Similarly, the various plates 320, 322, 324, 326, 340, 342, 370, 372, 374, 376 may be generally referred to as the "plate assembly."

Figure 4:
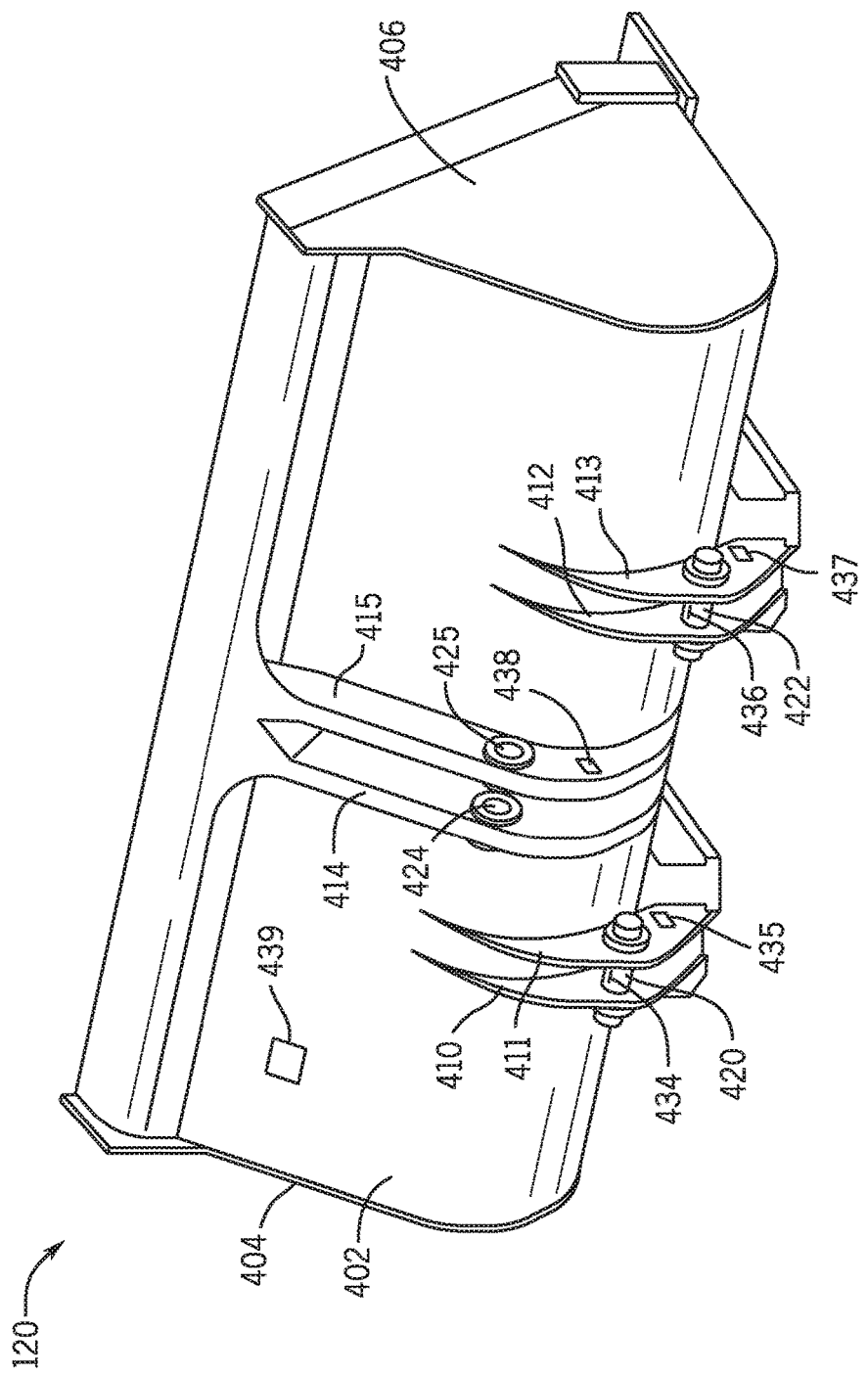
FIG. 4 is an isometric view of an implement of the work vehicle of FIG. 1 in accordance with an example embodiment.

FIG. 4 shows the implement 120 removed from other portions of the work vehicle 100 of FIG. 1. The implement 120 depicted in FIG. 4 is merely one example of a bucket, and other bucket configurations and/or completely different types of implements may be provided in other examples. As shown, the implement 120 generally has a rear wall 402 and side walls 404, 406 that define a receptacle to carry or otherwise manipulate a load of material. A number of flanges 410-415 extend from the rear wall 402, including a first pair of flanges 410, 411 on a left side of the rear wall 402 proximate to the bottom, a second pair of flanges 412, 413 on a right side of the rear wall 402 proximate to the bottom, and a third pair of flanges 414, 415 in the middle of the rear wall 402 proximate to an upper region. A pin 420 extends between the first pair of flanges 410, 411, and a pin 422 extends between the second pair of flanges 412, 413. In one example, the pins 420, 422 are respectively fixed relative to the flanges 410, 411, 412, 413, and during attachment with the coupler assembly 150, pins 420, 422 are received in the brackets 392 (FIG. 3) for partially securing the implement 120 to the coupler assembly 150. The third pair of flanges 414, 415 define a pair of holes 424, 425. During attachment to the coupler assembly 150, the cross member 390 (FIG. 3) extends through the holes 424, 425 to for partially secure the implement 120 to the coupler assembly 150. As such, collectively or individually, the flanges 410-415 and pins 420, 422 may be considered the implement portion of the implement connection interface between the coupler assembly 150 and the implement 120.

As introduced above, the implement 120 may include one or both of the acceleration sensor assembly 162 and the force sensor assembly 163 that collectively include one or more sensors or sensor elements 434-439 in various locations on or within the implement 120. For example, force sensor elements 434-438 in the form of strain gauges or load cells may be incorporated into the pins 420, 422 and/or any of the flanges 410-415, as schematically shown, to measure force data associated with the force transferred between the coupler assembly 150 and the implement 120. As another example, one or more acceleration sensors 439 may be incorporated into or mounted to the rear wall 402, as shown, or any other location to measure acceleration data.

As noted above, FIG. 5 shows the linkage assembly 130, particularly the pair of lift arms 132, tilt lever 138, and tilt link 142. As shown, the lift arms 132 define first and second lift mounting holes 502, 504, and the tilt link 142 defines a tilt mounting hole 506. Upon attachment to the coupler assembly 150, the pins 310, 312 of the coupler assembly 150 (FIG. 3) extend through the first and second mounting holes 502, 504 to at least partially secure the coupler assembly 150 to the linkage assembly 130. Similarly, upon attachment to the coupler assembly 150, the pin 314 of the coupler assembly 150 (FIG. 3) extend through the tilt mounting holes 506 to at least partially secure the coupler assembly 150 to the linkage assembly 130. As such, collectively or individually, the lift arms 132 and tilt link 142 may be considered the linkage portion of the linkage connection interface between the coupler assembly 150 and the linkage assembly 130.

As introduced above, the lift arms 132 may include one or both of the acceleration sensor assembly 164 and the force sensor assembly 165 that collectively include one or more sensors or sensor elements 510-513 in various locations. As examples, force sensor elements 510, 511 in the form of strain gauges or load cells may be incorporated at the ends of the lift arms 132, as schematically shown, to measure force data associated with the force transferred between the coupler assembly 150 and the linkage assembly 130. As another example, one or more acceleration sensors 512, 513 may be incorporated into or mounted at the ends of the lift arms 132, as schematically shown, to measure acceleration data. Similarly, the tilt link 142 may include one or both of an acceleration sensor assembly 166 and a force sensor assembly 167 that collectively include one or more sensors or sensor elements 514, 515 in various locations. For example, force sensor elements 514 in the form of strain gauges or load cells may be incorporated at the ends of the tilt link 142, as schematically shown, to measure force data associated with the force transferred between the coupler assembly 150 and the linkage assembly 130. As another example, one or more acceleration sensor elements 515 may be incorporated into or mounted at the ends of the tilt link 142, as schematically shown, to measure acceleration data.

Figure 6:
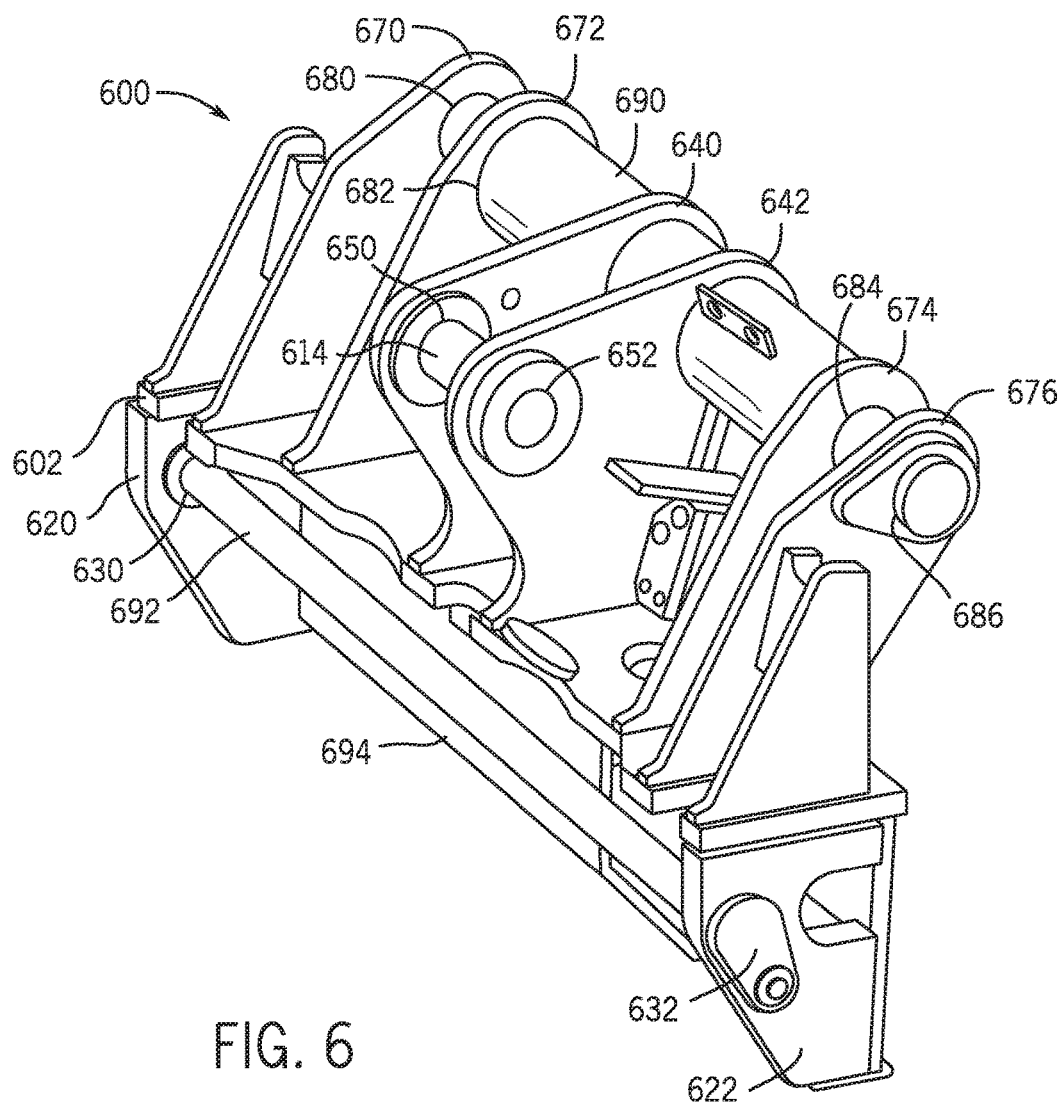
FIG. 6 is an isometric view of a coupler assembly of the work vehicle of FIG. 1 in accordance with another example embodiment.

FIGS. 1 and 3-5 provide various examples of the work vehicle 100, implement 120, linkage assembly 130, and the coupler assembly 150. Other examples that may be used as alternatives or in combination with the examples above will be discussed below. FIG. 6 shows a coupler assembly 600 in accordance with another exemplary embodiment. Generally, with the exceptions noted below, the coupler assembly 600 of FIG. 6 is similar to the coupler assembly 150 of FIGS. 1 and 3. Here, the coupler assembly 600 includes a body element 602 that supports lift mounting plates 620, 622, tilt mounting plates 640, 642, and support plates 670, 672, 674, 676. As above, the tilt mounting plates 640, 642 define tilt mounting holes 650, 652 that are aligned to accommodate a tilt mounting pin 614, and the support plates 670, 672, 674, 676 respectively define implement mounting holes 680, 682, 684, 686 to accommodate a cross member 690. In this example, the lift mounting plates 620, 622 define lift mounting holes 630, 632 that accommodate a single extended pin or cross member 692. Although not shown in FIG. 6, additional support plates to accommodate the cross member 692 may also be provided. A linkage assembly (e.g., linkage assembly 130) may be attached to the coupler assembly 600 at the cross member 692.

The coupler assembly 600 further includes an induction sensor 694 in the form of a plate structure mounted to the underside of the body element 602 proximate to the cross member 692. As a result of this arrangement, the sensor 694 may collect force data in the form of deflection and mode shape measurements of the cross member 692 as force is transferred between the coupler assembly 600 and the linkage assembly due to manipulation of a load. In addition to the sensor 694, the coupler assembly 600 may include further sensor elements, including acceleration sensor element 606 mounted to the body element 602 or other coupler component. As discussed above, the load measuring system 200 (FIG. 2) is configured to calculate the mass of the load based on the force data and acceleration data.

Figure 7:
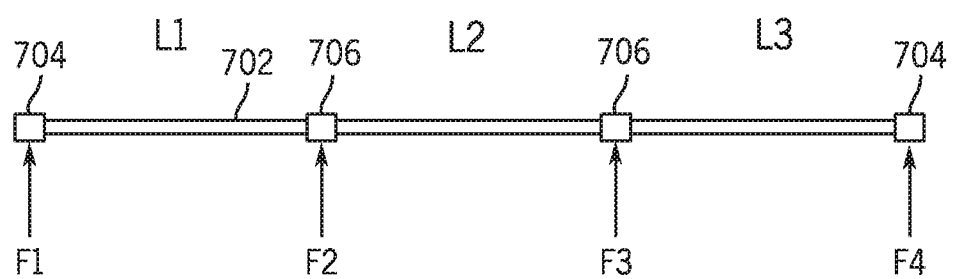
FIG. 7 is a free body diagram used to describe one mechanism for calculating force in the load measuring system of FIG. 2.

FIG. 6 illustrates one example of a combination of force sensor elements from which the control module 210 of the load measuring system 200 (FIG. 2) may derive force values from deflection measurements. Other examples may include the pins and cross-members discussed above in reference to FIGS. 1 and 3-6. Referring to FIG. 7, for example, which is a free body diagram 700 used to describe one mechanism by which force may be derived from deflection. In FIG. 7, a measurement body 702 (e.g., a beam, pin, or cross-member) is considered to be supported on each end by a support structure (e.g., a plate or support element) and subject to forces by an external body in one or more locations. Using the example of FIG. 6, the coupler assembly 600 may be considered the support structure 704, the cross member 692 may be considered the measurement body 702, and the lift arms coupled to the cross member 692 may be considered the external body 706, although this example may be applicable to any of arrangement discussed above suitable for measuring deflection. In the free body diagram 700, the support structure 704 acts on the measurement body 702 with forces F1 and F4, and the external body 706 acts on the measurement body 702 with forces F2 and F3. As shown, the forces F1, F2, F3, F4 are separated from one another by lengths L1, L2, L3. These forces F1, F2, F3, F4 result in a beam shape that is a function of where and how the measurement body 702 is loaded. The beam shape may be measured as deflection values at one or more positions (x) along the overall length of the measurement body. This is result of the shear force internal to the measurement body 702 being the third derivative of the deflection curve. As such, the forces may be represented by the following expressions:

$$\text{Deflection} =$$
$$\text{For } x = 0 \text{ to } L1$$
$$-\frac{F1x^3}{6} + \theta_0 + d_0$$
$$\text{For } x = L1 \text{ to } L1 + L2$$
$$\frac{[-F1x^3 - (F1+F2)(x-L1)^3]}{6} + \theta_0 + d_0$$
$$\text{For } x = L1 + L2 \text{ to } L1 + L2 + L3$$
$$\frac{[-F1x^3 - (F1+F2)(x-L1)^3 - (F1+F2+F3)(x-L1-L2)^3]}{6} + \theta_0 + d_0$$

wherein, x=the measurement position; $\theta_0$=the initial angle of deflection; and $d_0$ is the value of the initial deflection.

From these expressions, if one assumes even loading: F1=F4, F2=F3, F1=−F2, and L1=L3, then the forces may be solved upon measurement at any position along the measurement body 702 when the contacts are rigid (since in this condition, $d_0$ is 0 and deflection at x=L1+L2+L3 is 0). If the contacts are compliant with even loading, then the forces may be solved upon measurement at any three positions along the measurement body 702. As a general solution, F4=−(F1+F2+F3) such that the forces may be solved by measuring any four positions along the measurement body 702 when the contacts are rigid or by measuring any six positions along the measurement body 702 when the contact are compliant.

Figure 8:
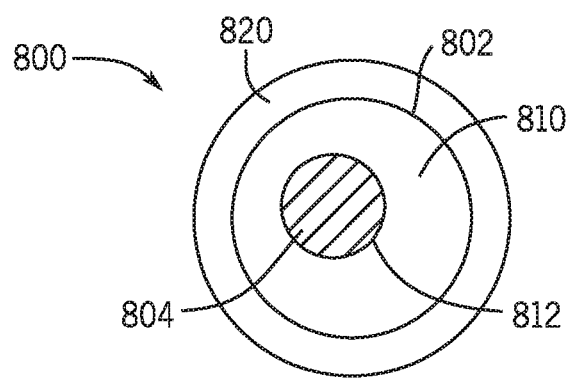
FIG. 8 is a simplified view of an example force sensor assembly that may be incorporated into the work vehicle of FIG. 1.

A further example of force sensor elements that may be incorporated into the various components of the work vehicle 100 (FIG. 1) is depicted in FIG. 8. In this example, the force sensor elements form an induction sensor that may be incorporated into a bushing component 800. Generally, a bushing is a bearing member interposed between two elements, such as two cylindrical surfaces. In particular, the bushing component 800 may be incorporated within or proximate a mounting hole 802, such as any of the mounting holes discussed above. As an example, the bushing component 800 may be incorporated into the mounting holes 502, 504, 506 in the linkage assembly 130 (FIG. 5) and/or the mounting holes 330, 332, 334, 336, 350, 352, 360, 362 in the coupler assembly 150 (FIG. 3) through which a pin or cross member (e.g., pins 310, 312, 314 or cross member 390) extends upon assembly. In this example, the bushing component 800 includes a bushing material (or bushing) 810 placed between a pin 804 and the mounting holes 802. Generally, the bushing material 810 may be rubber or viscoelastic with properties that enable predictable expansion and contraction of the material 810 under loads. Accordingly, an induction sensor 820 is positioned proximate the pin 804 to measure displacement of the pin 804 subject to the load. As shown, the bushing material 810 may define a bushing hole 812 that is off-center in the along the x-axis and the y-axis relative to the mounting hole 802 such that displacement may be evaluated based on the concentricity and deflection of the bushing material 810. Based on these measurements, the control module 210 (FIG. 2) may derive force. The bushing component 800 may be calibrated to adjust for changes in the properties of the bushing.

Figure 9:
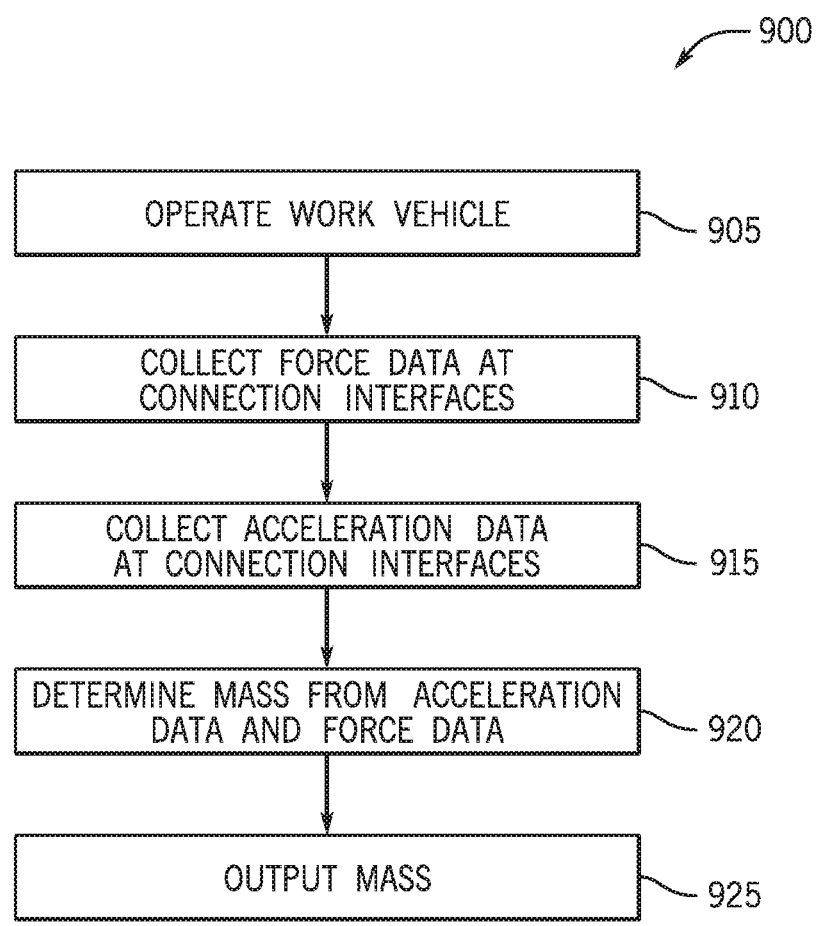
FIG. 9 is a flowchart illustrating a load measuring method in accordance with an example embodiment.

FIG. 9 is a flowchart of a method 900 for calculating the mass of a load within an implement of a work vehicle, such as implement 120 of work vehicle 100 (FIG. 1). In one example, the method 900 may be implemented with the system 200 (FIG. 2) discussed above in conjunction with the various components of FIGS. 1-8. In a first step 905, the work vehicle is operated to manipulate a load with a work implement. During operation, the work vehicle is subject to forces and accelerations attributable to the mass of the load within the work implement. In a second step 910, force data associated with force transferred between the work implement and the work vehicle is collected by a force sensor assembly. In a third step 915, acceleration data associated with acceleration of the load in the work implement is collected with an acceleration sensor assembly. In a fourth step 920, the mass of the load is calculated based on the force values and the acceleration values by a controller of the system 200. In a fifth step 925, the mass of the load is presented to an operator via an output device.

As will be appreciated by one skilled in the art, certain aspects of the disclosed subject matter can be embodied as a method, system, or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the disclosure. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A coupler assembly for coupling a work implement to a work vehicle, comprising:
    a coupler mounted to the work vehicle and to the work implement, the coupler having a first connection interface for the work vehicle and a second connection interface for the work implement;
    at least one force sensor mounted to the coupler and configured to collect force data associated with force transferred by the coupler assembly from the work implement to the work vehicle; and
    at least one acceleration sensor mounted to the coupler and configured to collect acceleration data associated with acceleration of the coupler assembly during operation;
    wherein the acceleration sensor and the force sensor are configured to be coupled to a controller that receives and processes the force data and the acceleration data to determine a mass of a load of the work implement; and
    wherein the force sensor and the acceleration sensor are located at one or more of the first and second connection interfaces, and the force sensor collects the force data in the form of deflection or deformation values associated with deflections or deformations at one or more of the first and second connection interfaces resulting from the work implement interacting with a load.

2. The coupler assembly of claim 1, wherein the acceleration sensor is configured to measure the acceleration data in at least two axes and the force sensor is configured to measure the force data in the at least two axes.

3. The coupler assembly of claim 1, wherein the coupler includes:
    a plate assembly with a mounting hole; and
    a pin extending through the mounting hole to attach the coupler to a linkage of the work vehicle;
    wherein the force sensor includes a deformable bushing mounted to the pin and an induction sensor on the plate assembly to measure deformation of the deformable bushing as the force data.

4. The coupler assembly of claim 1, wherein the coupler includes a first pair of mounting plates defining a first pair of mounting holes and a first pin, the first pin extending through the first pair of mounting holes and configured to connect to a lift arm of the work vehicle at the first connection interface; and
    wherein the force sensor is incorporated into the first pin.

5. The coupler assembly of claim 1, wherein the coupler includes a support plate defining a linkage hole and a first pin, the first pin extending through the linkage hole and configured to connect to a tilt arm linkage of the work vehicle at the first connection interface;
    wherein the force sensor is incorporated into the first pin.

6. The coupler assembly of claim 1, wherein the coupler includes a plurality of support plates and a cross member extending between the support plates to form the second connection interface; and
    wherein the force sensor is incorporated into the cross member.

7. The coupler assembly of claim 1, wherein the coupler includes:
    a body element;
    a first mounting plate mounted to the body element and defining a first mounting hole;
    a second mounting plate mounted to the body element and defining a second mounting hole aligned with the first mounting hole; and
    a cross member extending between the first and second mounting holes that forms the first connection interface;
    wherein the force sensor collects the force data in the form of deflection values associated with deflections of the cross member resulting from the work implement interacting with a load.

8. The coupler assembly of claim 7, wherein the force sensor is at least one of a strain gauge incorporated into the cross member or an induction sensor mounted to at least one of the body element, the first mounting plate, and the second mounting plate.

9. The coupler assembly of claim 1, wherein the acceleration sensor is an inertial measurement unit (IMU).

10. A work vehicle, comprising:
    a chassis supported by ground-engaging wheels or tracks;
    a machine linkage coupled to the chassis;
    a coupler connected to the machine linkage;
    a work implement mounted to the coupler for carrying a load with a mass; and
    a load measurement system, including:
        at least one force sensor mounted to at least one of the machine linkage, the coupler assembly, and the work implement and configured to collect force data associated with force transferred between at least one of the machine linkage and coupler assembly or the coupler assembly and the work implement;
        at least one acceleration sensor mounted to at least one of the machine linkage, the coupler assembly, or the work implement to collect acceleration data associated with acceleration of the load during operation, wherein at least one of the force sensor and the acceleration sensor is incorporated into the coupler; and
        a controller coupled to the force sensor and the acceleration sensor and configured to receive and process the force data and the acceleration data to determine the mass of the load;
    wherein the force sensor collects the force data in the form of deflection or deformation values associated with deflections or deformations of one or more components of the coupler resulting from the work implement interacting with the load.

11. The work vehicle of claim 10, wherein the load measurement system includes an output device coupled to the controller and configured to output an indication of the determined mass.

12. The work vehicle of claim 10, wherein the machine linkage includes at least one lift arm attached to the coupler to lift the coupler and the work implement and at least one tilt arm to tilt the coupler and the work implement; and wherein the force sensor includes a strain gauge for measuring strain along the tilt arm as the force data.

13. The work vehicle of claim 10, wherein the machine linkage includes at least one linkage arm defining a first mounting hole; and wherein the coupler includes:
   a plate assembly with a second mounting hole; and
   a pin extending through the first mounting hole and the second mounting hole to attach the coupler to the machine linkage; and
   wherein the force sensor includes a deformable bushing positioned within the first mounting hole between the pin and the machine linkage and an induction sensor positioned on the plate assembly to measure a deformation of the deformable bushing as the force data.

14. The work vehicle of claim 10, wherein the machine linkage includes first lift arm defining a first linkage mounting hole, a second lift arm defining a second linkage mounting hole, and at least one tilt arm defining a third linkage mounting hole; and wherein the coupler includes:
   a body element;
   a first pair of mounting plates extending from the body element and defining a first set of coupler mounting holes;
   a first pin extending through the first linkage mounting hole and the first set of coupler mounting holes to attach the coupler to the machine linkage,
   a second pair of mounting plates extending from the body element and defining a second set of coupler mounting holes;
   a second pin extending through the second linkage mounting hole and the second set of coupler mounting holes to attach the coupler to the machine linkage;
   a third pair of mounting plates extending from the body element and defining a third set of coupler mounting holes;
   a third pin extending through the third linkage mounting hole and the third set of coupler mounting holes to attach the coupler to the machine linkage.

15. The work vehicle of claim 14, wherein the force sensor includes:
   first, second, and third deformable bushings respectively positioned within the first, second, and third linkage mounting holes on the first, second, and third pins; and
   first, second, and third induction sensors respectively positioned proximate to the first, second, and third sets of coupler mounting holes to measure deformation of the first, second, and third deformable bushings as the force data.

16. A method of determining a mass of a load carried by a work implement coupled to a work vehicle by a linkage assembly and a coupler, the method comprising:
   collecting, with at least one force sensor, force data associated with force transferred between the work implement and the work vehicle during operation;
   collecting, with at least one acceleration sensor, acceleration data associated with acceleration of the load in the work implement during operation; and
   determining, with one or more controllers, the mass of the load based on the force and acceleration data;
   wherein the at least one force sensor collects the force data in the form of deflection or deformation values associated with deflections or deformations of one or more components of the coupler resulting from the work implement interacting with the load.

17. The method of claim 16, further comprising:
   outputting, with an output device, the mass of the load to an operator.

18. The method of claim 16, wherein the step of collecting the force data includes collecting the force data with one or more of a strain gauge and an induction sensor.

19. The method of claim 16, wherein the step of collecting the acceleration data includes collecting the acceleration data with one or more of an accelerometer and an inertial measurement unit (IMU).

20. The method of claim 16, wherein the force sensor and the acceleration sensor are mounted to the coupler.

* * * * *